United States Patent
Aden et al.

(10) Patent No.: US 12,535,424 B2
(45) Date of Patent: Jan. 27, 2026

(54) METHOD OF ANALYSING FOODSTUFF SAMPLES USING LASER-INDUCED BREAKDOWN SPECTROSCOPY

(71) Applicant: FOSS Analytical A/S, Hilleroed (DK)

(72) Inventors: Daniel Aden, Hilleroed (DK); Nicolai Bork, Hilleroed (DK)

(73) Assignee: FOSS Analytical A/S, Hilleroed (DK)

( * ) Notice: Subject to any disclaimer, the term of this patent is extended or adjusted under 35 U.S.C. 154(b) by 202 days.

(21) Appl. No.: 18/291,070

(22) PCT Filed: Sep. 30, 2022

(86) PCT No.: PCT/IB2022/059323
§ 371 (c)(1),
(2) Date: Jan. 22, 2024

(87) PCT Pub. No.: WO2023/067417
PCT Pub. Date: Apr. 27, 2023

(65) Prior Publication Data
US 2024/0361249 A1    Oct. 31, 2024

(30) Foreign Application Priority Data

Oct. 18, 2021 (DK) .............................. PA202100994

(51) Int. Cl.
  *G01N 21/71* (2006.01)
  *G01N 1/28* (2006.01)
  (Continued)

(52) U.S. Cl.
  CPC ............ *G01N 21/718* (2013.01); *G01N 1/286* (2013.01); *G01N 1/44* (2013.01); *G01N 33/02* (2013.01)

(58) Field of Classification Search
  CPC ........ G01N 21/718; G01N 1/286; G01N 1/44; G01N 33/02
  See application file for complete search history.

(56) References Cited

U.S. PATENT DOCUMENTS

2005/0012244 A1  1/2005  Jones
2016/0146002 A1  5/2016  Walls et al.

FOREIGN PATENT DOCUMENTS

| AU | 2021103159 A4 * | 7/2021 | ........... G01N 21/718 |
| WO | WO-2018046981 A1 | 3/2018 | |
| WO | WO-2020/106020 A1 | 5/2020 | |

OTHER PUBLICATIONS

Alzahrani, HR et al. Determination of macro, essential trace elements, toxic heavy metal concentrations, crude oil extracts and ash composition from Saudi Arabian fruits and vegetables having medicinal values. Arabian Journal of Chemistry, Nov. 2017, pp. 906-913 [Retrieved on Jan. 7, 2022]. Retrieved from (open access) <https://www.sciencedirect.com/science/article/pii/S1878535216301563?via%3Dihub> Section 2.1.4.

(Continued)

*Primary Examiner* — Jamil Ahmed
(74) *Attorney, Agent, or Firm* — Harness, Dickey & Pierce, P.L.C.

(57) ABSTRACT

A method of analysing a foodstuff sample using laser-induced breakdown spectroscopy, comprises: ashing the foodstuff sample to generate an ash residue; and forming the ash residue into a layered pellet based on: loading at least the portion of the ash residue into a die, loading a support material into the die as a layer covering a second surface of the portion of the ash residue subsequently to loading at least the portion of the ash residue into the die, and compressing the portion of the ash residue and the support material in the die to form the layered pellet, such that a first surface of the portion of the ash residue at least partially defines the first surface of the layered pellet and the portion of the ash residue is undiluted by the support material at least at the first surface of the portion of the ash residue.

9 Claims, 5 Drawing Sheets

(51) Int. Cl.
    *G01N 1/44* (2006.01)
    *G01N 33/02* (2006.01)

(56) References Cited

OTHER PUBLICATIONS

Markiewicz-Keszycka M. et al., 2017, 'Laser-induced breakdown spectroscopy (LIBS) for food analysis: A review', Trends in Food Science & Technology, vol. 65, pp. 88-93].
Lázaro M. et al., 2021, 'Dry Ashing for Signal Enhancement in Laser-Induced Breakdown Spectroscopy (LIBS)', Analytical Letters, vol. 54, No. 12, pp. 2009-2021].
"Characterization of Milk from Mastitis-Infected Cows Using LIBS as a Molecular Analytical Technique Food Anal. Methods, 10, pp. 2422-2428 Jan. 20, 2017 DOI 10.1007/s12161-017-0801-x".
International Search Report for International Application No. PCT/IB2022/059323 dated Sep. 30, 2022.
Written Opinion for International Application No. PCT/IB2022/059323 dated Sep. 30, 2022.
Danish Search Report For Danish Patent Application No. PA202100994 dated Oct. 18, 2021.

\* cited by examiner

METHOD OF ANALYSING FOODSTUFF SAMPLES USING LASER-INDUCED BREAKDOWN SPECTROSCOPY

CROSS-REFERENCE TO RELATED APPLICATIONS

This application is a National Stage of PCT/IB2022/059323, filed on Sep. 30, 2022, which claims priority to Danish Patent Application PA202100994, filed on Oct. 18, 2021 in the Danish Patent and Trademark Office, the entire contents of each of which are incorporated herein in their entirety.

BACKGROUND

The present invention relates to laser-induced breakdown spectroscopy (LIBS) and in particular to a method of analysing foodstuff samples using LIBS.

Minerals are an essential part of human and animal nutrition whereas heavy metals and other toxic contaminants, whether accidentally or intentionally added, are potentially harmful, even in very small amounts. It is therefore important to be able to accurately determine the presence and/or amounts of minerals and other inorganic compounds in human and animal foodstuff (in the present context the term 'foodstuff' means solid or liquid raw materials; and intermediate or final products; which make up human and animal food, feed and drink).

LIBS is an atomic emission spectroscopy technique according to which a high powered laser beam pulse is focused onto a portion of a sample to produce a plasma. As the plasma cools, eventually the electrons return to their ground states. In the process, electromagnetic radiation is generated with wavelengths that are unique to the specific elements comprising the sample. The detection and analysis of the emission wavelengths related to the elements of interest in a LIBS analysis system enables a quantitative and/or a qualitative analysis of the elemental makeup of a sample to be made with a limit of detection in the parts per million range or better.

A review of the use of LIBS for foodstuff analysis [Markiewicz-Keszycka M. et al., 2017, 'Laser-induced breakdown spectroscopy (LIBS) for food analysis: A review', Trends in Food Science & Technology, vol. 65, pages 88-93] concluded that whilst LIBS showed many advantages challenges remained in terms of sample preparation and matrix effects. An uneven sample surface attenuates the plasma intensity significantly and the review notes that most samples were dried, powdered material which was pressed to form pellets. Thus a flat, densely packed surface could be presented for LIBS analysis. Low signal to noise ratios of samples with complex organic matrices, such as are found in foodstuffs, was disclosed as a major challenge as was variations in chemical and physical properties of these matrices ('matrix effects') which result in matrix dependent changes in signal intensities at the wavelengths monitored in LIBS analysis. Moreover some foodstuffs, for example ketchup; wine; canned dogfood; and other similarly non-solid materials, cannot easily be pelletized.

Different technologies may be found in US-2005/0012244-A1, WO-2020/106020-A1 and Alzahrani, H R et al. "Determination of macro, essential trace elements, toxic heavy metal concentrations . . . " Arabian Journal of Chemistry, November 2017, pp 906-913. It is also known, such as from "Characterization of Milk from Mastitis-Infected Cows . . . " by Z. Abdel-Salam et al, Food Anal. Methods, 20 Jan. 2017, that liquid samples may be applied on to a surface as droplets and allowed to dry before the LIBS analysis is performed.

Ashing the sample in order to improve sensitivity and reduce matrix effects of the LIBS analysis of botanical, agronomic and industrial samples has been proposed [Lázaro M. et al., 2021, 'Dry Ashing for Signal Enhancement in Laser-Induced Breakdown Spectroscopy (LIBS)', Analytical Letters, vol. 54, No. 12, pages 2009-2021]. Here samples were ashed by heating to a sufficiently high temperature and for a sufficiently long time in order for them to completely oxidise and leave relatively concentrated inorganic ash residues.

One problem associated with ashing foodstuffs is that the sample matrix is predominately organic material. By its nature, ashing removes organic material, so that when a foodstuff sample is ashed only a small percentage of the original mass of the foodstuff sample remains as ash residue. Indeed, foodstuff samples which are typically presented for analysis, for example in food analysis laboratories, are in the region of only 10 grams (10 g) or less. These will yield typically only in the order of 50-500 milligrams (50 mg-500 mg) of ash residue, which is difficult to press into a pellet for LIBS analysis since the pellet thickness is too thin to endure a LIBS measurement and the pellet will collapse.

SUMMARY

According to the present invention there is provided a method of analysing a foodstuff sample by LIBS, the method comprising: ashing a foodstuff sample to generate an ash residue; forming the ash residue into a pellet; exposing a first surface of the ash residue of the pellet; and subjecting the exposed first surface to a LIBS analysis; wherein forming the ash residue into a pellet comprises: loading into a die at least a portion of the ash residue followed by a support material as a layer covering a second surface of the ash residue opposite the first surface; and compressing the ash residue and the support material in the die to form a layered pellet. Preferably, the compression is along a direction at least substantially perpendicular to the first surface.

Ashing of a material is a well-known process. It is, however, noted that not all sample types are desired ashed. Some sample types may simply be dried and then added to the die. Ashing has a number of advantages such as when converting the matrix in which the relevant molecules are present, but for some sample types, this is not required. The providing of the support material and the compression will function well also with dried samples.

The support material, together with the ash residue, preferably provides sufficient material to allow successful pellet formation so that the pellet, for example, may stay in the desired shape even when the pellet, while in the die, or the pellet itself is manipulated. Moreover, by providing this support material as a layer, no homogenization of the support material and the ash residue is required. This reduces the complexity of pellet formation and facilitates that the first surface of the pellet that is exposed for LIBS analysis is only ash residue, preferably undiluted by the support material. This potentially increases the sensitivity of the LIBS analysis as the inorganic materials of interest are now concentrated in the ash residue.

In this context, to be preferably undiluted by the support layer, at least at the first surface, the ash layer of the pellet preferably has a layer thickness, in a direction perpendicular to the first surface of at least 5 μm, such as at least 10 μm to avoid exposure of the support layer due to laser ablation.

In principle, the ash layer may have any layer thickness before compression, but it is preferred that the uncompressed layer thickness is at least 250 µm, such as at least 500 µm and that the final or uncompressed layer is at least substantially even, so that a lowest layer thickness exceeds 50%, such as 75%, of a mean layer thickness.

The support material may be particulate and thus be shaped into the pellet by the compression. Alternatively, the support material may have another shape and be a more monolithic structure, such as when having a pellet shape itself. The support material may be a monolithic element or an element made itself from a plurality of elements, such as a compressed particulate material. Forming the support material into a pellet shape may simplify the dosing or providing thereof into the die.

The compression may be performed under any desired circumstances. Preferably, the support material is dry, so that the compression is under dry circumstances. The temperature may be elevated if this assists the support material in obtaining the pellet shape or in engaging or attaching to the die wall. Preferably, the compression is performed at room temperature, as this is the most energy efficient.

In some embodiments the support material is a material selected not to present emission wavelengths, such as when not emitting an intensity, at any wavelength, exceeding 10% of an intensity emitted at the wavelength from which the highest intensity is emitted by the ash residue, during the LIBS analysis which lie within a wavelength region of interest associated with the ash residue. This reduces any adverse effect that the support material may have on the accuracy of the LIBS analysis of the ashed residue. Such a material may be one or more selected from the group consisting of: cellulose, calcium carbonate, maize starch, talcum, and gypsum but it will be appreciated that the choice of support material is not critical to the present invention. Suitable material may have a low mineral content. It is desired that the substrate material is dry, as any fluid may wet the ash residue and seriously affect the analysis.

A particulate material may have any particle size. It may be desired that the average particle diameter is below 1 mm in order to not provide a too uneven surface for the ash residue layer. However, if the particles are able to deform under the compression, this is of a lower importance, as the surface may then be smoothed during the compression. The particle size may be decisive in defining the surface roughness of the compressed support material (see below).

Also, it is preferred that the substrate material in itself is capable of, after compression, form a suitably stiff carrier for it to remain pellet-shaped even during manipulation of the pellet itself or when still positioned in the die. Thus, the support material may itself be capable of obtaining and maintaining the pellet shape after compression. Alternatively, the support material may comprise a solid component and a combining component where the combining component is activated during compression to combine the solid component to maintain the pellet shape after compression. Again, the combining component is desired to be a dry component both before, during and after compression.

Alternatively, as is usual in analysis, the contribution of emitted radiation from the substrate material may be determined or estimated and then compensated for.

It is desired that the layer of ash residue and the support layer attach to each other. This attachment may be mechanical, such as when the support layer has a rough surface to which the ash residue layer may mechanically connect. Thus, the surface preferably has a surface roughness, such as determined as Ra: the average offset from the mean, of 1 mm or less, such as 500 µm or less, such as 250 µm or less, such as 150 µm or less. One manner of obtaining the surface roughness of the support layer toward the ash residue layer is to provide the support material as a particulate matter, so that the particulates of this material will interact with the ash residue during compression along a direction more or less perpendicular to the first surface. Also, the surface roughness may be reduced by initially compressing the support layer material before adding the ash residue.

Naturally, the support material may be provided as a pellet shaped material with a surface with the desired roughness, so that the compression acts to compress the ash residue and have the ash residue attach to the support material, which may also be compressed or compressed further in this step. A surface roughness may be provided or adapted in a number of manners, such as by providing a particulate material on the surface of a body and attaching this to the body, such as by compression, heat, adhesion or the like. Alternatively, the surface of the body may be sputtered or the like to have the surface made rougher—or be polished if the surface is initially too rough.

It is preferred that the support material, in addition to or alternatively to the preferred surface roughness, has a plane surface facing the ash residue. If the surface is plane, the ash residue layer needs not be too thick in order to ensure that the support material is not so close to the ash residue surface that the support material will interfere with the analysis. Thus, preferably the surface of the support material toward the ash residue is, in the compressed state, so plane that no portion of the support material extends more than 500 µm, such as 250 µm or less, such as 150 µm or less, above a general plane of that surface.

In some embodiments loading into a die at least a portion of the ash residue and the support material comprises loading into a die comprising a tubular body and removable closure arrangement, the removable closure sealing an end of the tubular body and being provided with a flat surface facing the tubular body, which flat surface abuts the first surface of the ash residue when the layered pellet is formed. The flat surface of the removable closure ensures that the first surface of the ash residue has a repeatable surface flatness after the layered pellet is formed. Moreover, exposing the first surface of the ash residue of the pellet is, in some embodiments, achieved simply by removing the removable closure. Thus, the layered pellet may remain within the tubular body for LIBS analysis which provides physical protection for the layered pellet during handling and LIBS analysis. In that situation, it may be desired that the support material is selected to be deformable or expandable during compression to be biased or otherwise attached to the walls of the die after compression, so that the pellet may remain in the die during analysis. This has the advantage that the manipulation of the pellet between compression and analysis may be performed by manipulation of the die. Thus, the pellet need not be sufficiently rugged to be handled directly.

Naturally, it may be desired to re-use the die so that the pellet then would be removable after analysis.

In some embodiments the flat surface of the removable closure may be formed on a raised portion of the removable closure, a periphery of which raised portion is dimensioned to contact and seal against an inner surface of the tubular body. This has an advantage that the die body may be used to provide physical protection to the first surface.

In some embodiments forming the ash residue into a pellet comprises distributing the ash residue as a layer covering the flat surface of the removable closure of the die, for example by pressing the ash residue in the die towards the flat surface. This has an advantage that a more flat surface of the pellet may result as there will be no gaps between the residue and the flat surface before compressing to form the pellet.

BRIEF DESCRIPTION OF THE DRAWINGS

These and other advantages of the present invention will be better understood from a consideration of the following description of one or more none limiting embodiments, made with reference to the drawings of the accompanying figures, of which.

DETAILED DESCRIPTION

Figure 1:
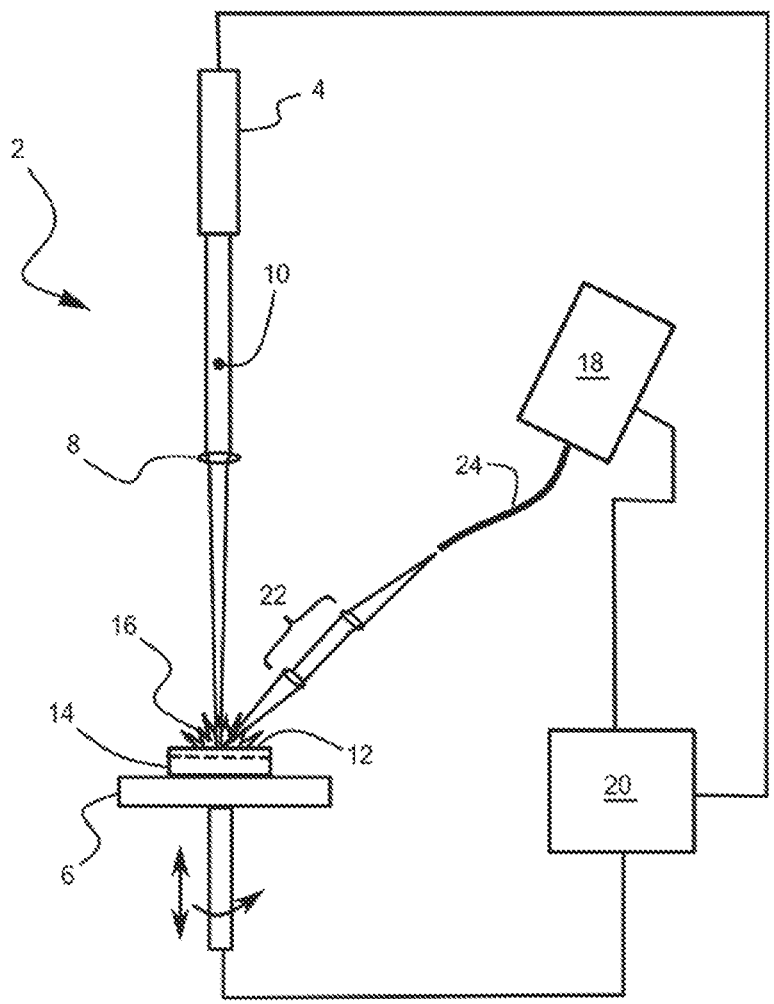
FIG. 1 is a schematic representation of a known LIBS analysis system.

A generic representation of a known LIBS analysis system 2 is illustrated in FIG. 1. The LIBS analysis system 2 is well known and will only be described here in sufficient detail in order for an appreciation of the present invention. Generally, the LIBS analysis system 2 comprises a pulsed laser 4, such as a Q-switched Nd:YAG laser; a sample stage 6 (typically a motorized XY or XYZ sample stage); focussing optics 8 for focussing laser beam pulses 10 generated by the pulsed laser 4 onto a first surface 12 of a sample, in the present invention a layered pellet 14, on the sample stage 6 to generate a plasma 16; a spectrometer 18; and a controller 20. The controller 20, which may comprise different physical elements cooperating to perform the function of the controller 20 as described, is configured in a known manner to control the operation of one or more of the pulsed laser 4, the spectrometer 18, the focussing optics 8 and the sample stage 6, in order to focus the laser beam pulses 10 onto one or more different regions of the first surface 12 and perform a LIBS analysis at each of them. Often collection optics 22, are provided to collect the electromagnetic radiation emitted by the plasma 16 as it cools and to focus it on an entrance of either the spectrometer 18 or an optical fiber 24, which is optically coupled to the entrance of the spectrometer 18. The spectrometer 18 operates in a known manner to separate the incoming electromagnetic radiation into a frequency (or wavelength) spectrum and measure the intensities of the electromagnetic energy at the different frequencies of interest for the LIBS analysis.

Figure 2:
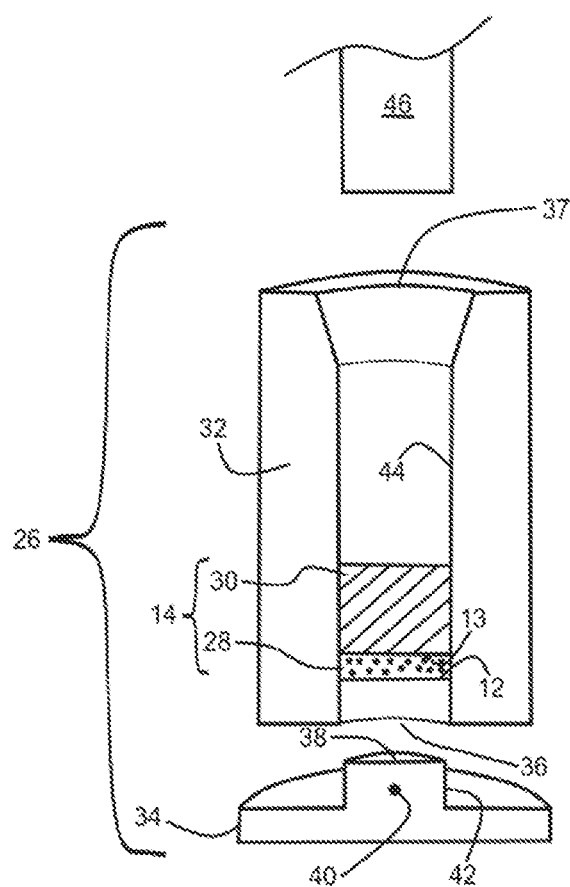
FIG. 2 is an example of a loaded piston according to the present invention.

Considering now FIG. 2, a die 26 that may be used in the method according to the present invention is illustrated containing ash residue 28 and a support material 30, such as cellulose support material 30, added to form a layer covering a second surface 13 of the ash residue 28 that is opposite the first surface 12. In the present example the die 26 comprises a cylindrical tubular body 32 having a first open end 36 and an opposing second open end 37. In the present example a removable closure 34 seals the first open end 36 of the tubular body 32 and is provided with a flat surface 38 facing the first open end 36 of the tubular body 32. The flat surface 38 abuts the first surface 12 of the ash residue 28 when it is loaded into the die 26. The flat surface 38 of the removable closure 34 ensures that the first surface 12 of the ash residue 28 has a repeatable surface flatness after the layered pellet is formed. The flat surface 38 is, in this example, formed on a raised portion 40 of the removable closure 34 and will be located within the tubular body 32 when the removable closure 34 seals the first open end 36. The raised portion 40 has a periphery 42 that is dimensioned to contact and seal against an inner surface 44 of the tubular body 32.

Once the die 26 is loaded with the ash residue 28 and the support material 30 a piston 46 is introduced through the second open end 37 to contact the support material 30 and provide a sufficient force to compress the ash residue 28 and the support material 30 and form the layered pellet 14. In the present embodiment a suitable force was found to be around a two ton-force applied for about 30 seconds for a 9 millimeter (9 mm) diameter layered pellet 14. Other forces and application times may be found through simple trial and error by applying the forces for the times and observing the quality of the so formed layered pellet 14. In some embodiments the piston 46 may be employed to initially apply a few kilogram-force, typically between 0.1-0.5 kilogram-force, such as 0.2 kilogram-force, directly to the ash residue 28 for a few, typically between 1 and 20 seconds, more typically less than 10 seconds, such as 2 seconds for a 9 mm diameter layered pellet 14, in order to distribute it as a layer covering the entire flat surface 38 of the removable closure 34 within the confines of the inner surface 44 of the tubular body 32.

It may be desired to ensure that the ash residue and the elements contacted thereby, such as the support material and the piston, are dry, as wetting of the ash residue may make it sticky, whereby part of it may remain attached to the piston, rendering the layer thickness thereof on the support material less well-defined. Thus, a drying step or element may be provided.

In other embodiments the removable closure 34 may be a piston, similar to piston 46, and formed with the flat surface 38. During compressing the ash residue 28 and the support material 30 by piston 46, this piston may be maintained in a position with the flat surface 38 flush with the first open end 36 of the tubular body 32 or in a position protruding past the first open end 36 and into the tubular body 32. After the layered pellet 14 is formed this piston with the flat surface 38 may be removed in order to expose the first surface 12 or to permit the piston 46 to move and push out the layered pellet 14 from the die tubular body 32. In some embodiments the piston 46 may be removed after formation of the layered pellet 14 and the piston with the flat surface 38 moved to push out the layered pellet 14 from the die tubular body 32.

Figure 3:
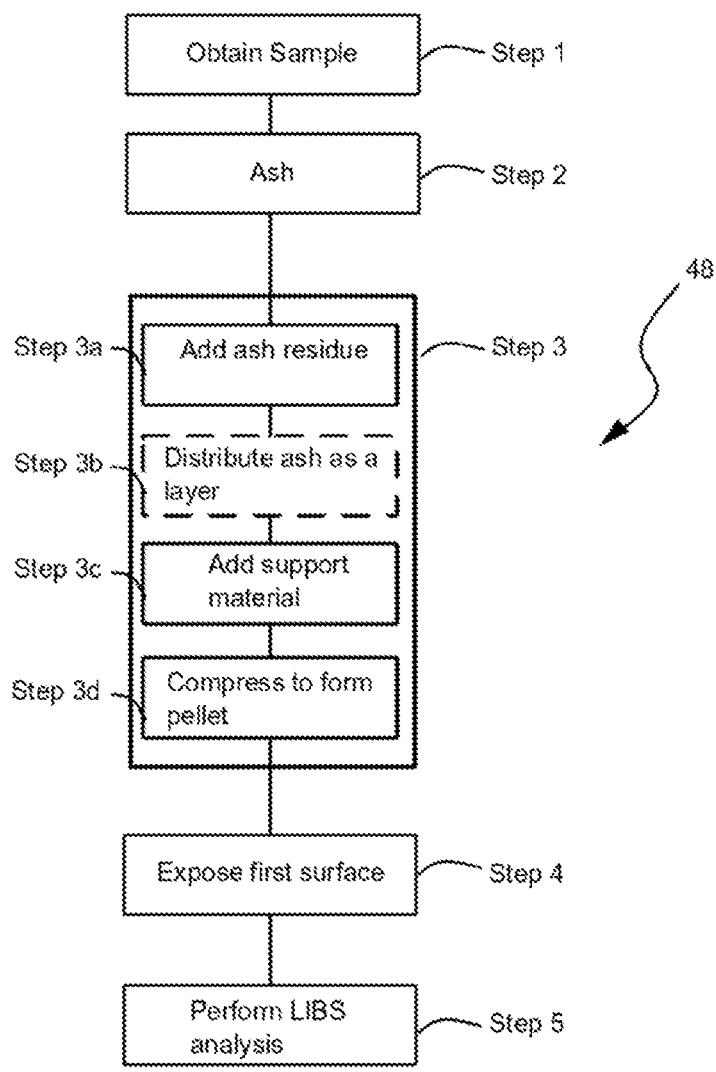
FIG. 3 is a flow chart representation of an example of the method according to the present invention.

A flow chart representation of a method 48 of analysing a foodstuff sample by LIBS according to the present invention is provided in FIG. 3. For ease of understanding this method 48 will be described with reference to the die 26 of FIG. 2 but it is to be understood that other dies may substitute for this die without departing from the invention as claimed. The method 48 comprises a Step 1 of obtaining a foodstuff sample for analysis; a Step 2 of ashing the foodstuff to generate an ash residue 28; a Step 3 of forming the ash residue 28 into a pellet, this Step 3 comprising a Step 3a of loading at least a portion of the ash residue 28 into a die, for example the die 26 of FIG. 2; an optional Step 3b of distributing the ash residue 28 in the die as a layer covering a closed bottom of the die, here covering the flat surface 38 of the removable closure 34 of the die 26 and having a first surface 12 adjacent the flat surface 38 and an opposing second surface 13; a Step 3c of loading the die with a particulate support material 30 as a layer covering the second surface 13 of the ash residue 28 and in a quantity sufficient for it to yield a solid support (as can be determined through simple trial and error by pressing pellets having different amounts of support material 30). With around 100 mg of ash residue between 200 mg and 500 mg of support material has been found to be suitable; and a Step 3*d* of compressing the ash residue and the particulate support material to form a layered pellet; a Step 4 of exposing the first surface 12 of the ash residue 28 of the layered pellet 14; and a Step 5 of subjecting the exposed first surface 12 to a LIBS analysis.

In a particular, non-limiting, example of the method 48 a taco spice mix foodstuff sample is analysed by LIBS as follows:

At Step 1 of the method 48 a 2 g frozen sample of taco spice mix is defrosted and dried in an oven at 70° C. overnight to obtain the foodstuff sample for analysis. In other embodiments, Step 1 of obtaining a foodstuff sample for analysis may involve grinding and/or weighing an appropriate amount of foodstuff or may not involve any preparation.

At the Step 2 the so obtained sample is ashed by heating at 523° C. for 10 hours. As a result 458 mg of ash residue is generated from the original 2 g of taco spice mix.

At the Step 3*a* a 100 mg portion of the ash residue is loaded into the die 26 and distributed as a layer (Step 3*b*) covering the flat surface 38 of the removable closure 34 of the die 26. In the present non-limiting example this Step 3*b* is performed by lightly pressing the ash residue 28 in the die 26 using a piston 46 to apply a few kilogram-force, here a 0.2 kilogram-force for 2 seconds, to the ash residue 28. Alternatively, agitation, such as manual or mechanical shaking of the die, or dispersing the ash residue 28 by dispensing it into the die 26 through a funnel or a sieve, may be employed here (Step 3*b*) to distribute the ash residue 28 as a layer as it is poured into the die 26 through its second open end 37. At the Step 3*c* particulate support material 30, here 300 mg of powdered cellulose, is added, covering the second surface 13 of the ash residue 28.

At the Step 3*d* the piston 46 is moved into the die 26 through its second open end 37 to contact the powdered cellulose particulate support material 30 and exert, here a 2 ton-force for 30 seconds, on the contents of the die 26. This compresses the powdered cellulose particulate support material 30 and the ash residue 28 into a layered pellet 14.

It is understood that the support material 30 could initially be provided with a pellet shape and merely be added to the die before compression.

At the Step 4 the first surface 12 of the ash residue 28 layer of the layered pellet 14 is exposed for LIBS analysis. In the present example this is achieved by removing the removable closure 34 of the die 26 but in other examples the layered pellet 14 may be removed completely from the die and subsequently presented for LIBS analysis.

At the step 5 LIBS analysis was performed on the exposed first surface 12 of the resulting layered pellets 14. Basically, and with reference to the LIBS analysis system 2 of FIG. 1 by way of example only, this is achieved by directing the laser beam pulse 10 onto the exposed first surface 12 of the taco spice mix ash residue 28 of the layered pellet 14 which is located on the sample stage 6 to produce a plasma ablation event and performing a spectrometric analysis of light emitted from plasma 16 generated in the plasma ablation event to identify constituent elements of interest in the ash residue 28 by their characteristic emission wavelengths. Usefully the layered pellet 14 remains housed in the die 26 with the removable closure 34 removed to expose the first surface 12 of the ash residue 28 of the layered pellet 14.

Figure 4:
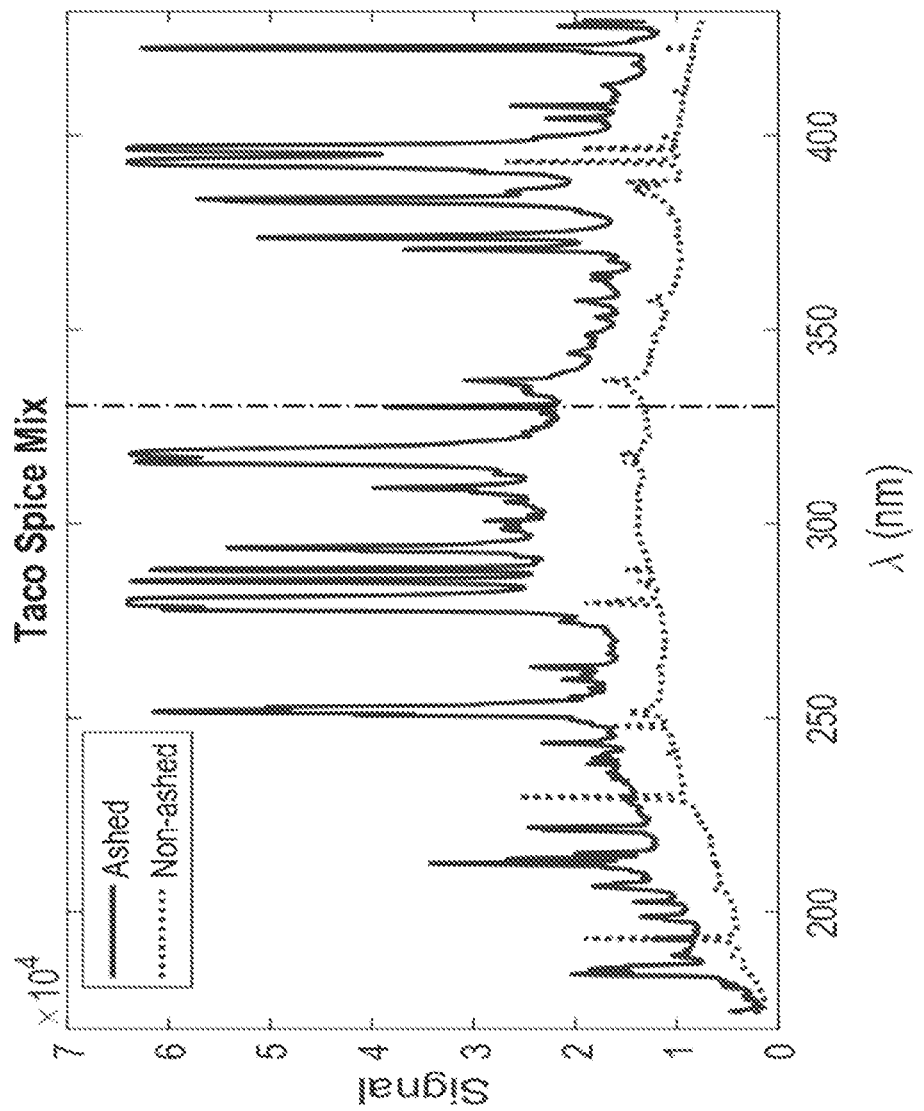
FIG. 4 is a graphical representation of spectra obtained using a LIBS analysis system for an ashed and a non-ashed sample of a taco spice mix foodstuff.

FIG. 4 illustrates representative spectra which have been generated by the spectrometer of a LIBS analysis system, for example such as the system 2 described with reference to FIG. 1, from taco spice mix samples for an ashed (solid line) pellet formed according to the method 48 of present invention described above with reference to taco spice mix and a non-ashed (broken line) pellet formed by pressing 2 g of the taco spice mix into a pellet. It can be clearly seen that the LIBS element emission signal from the ashed sample is significantly greater than that from the non-ashed sample as evidenced, for example, by the clearly identifiable emission line at 330 nanometers which is due to sodium (present as sodium chloride 'salt') in the taco spice mix.

Figure 5A:
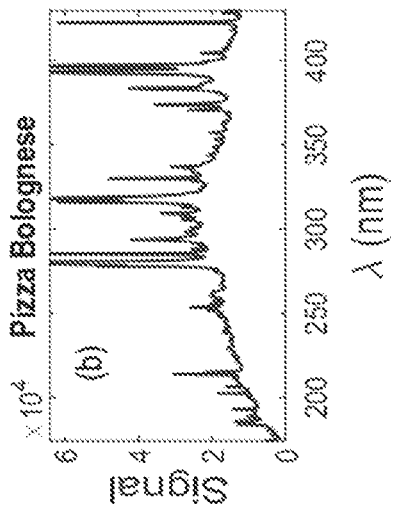
FIGS. 5A to 5D are graphical representations of spectra obtained using a LIBS system for four disparate foodstuff samples.
Figure 5B:
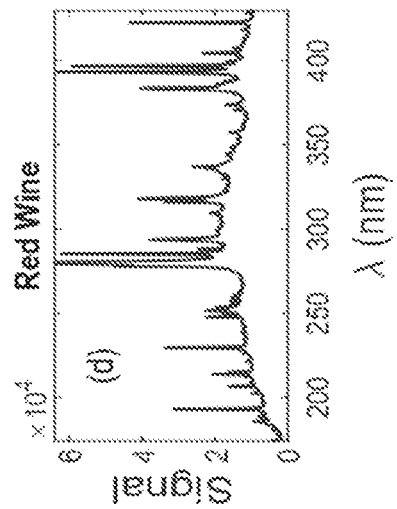
Figure 5C:
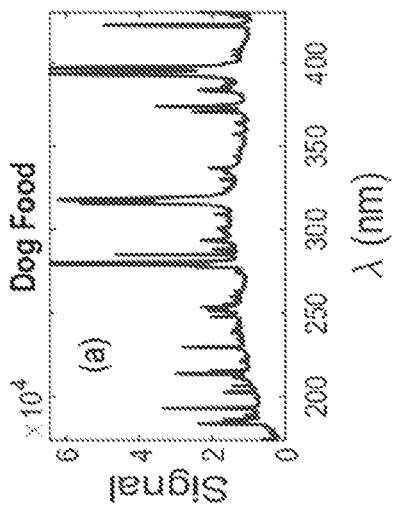
Figure 5D:
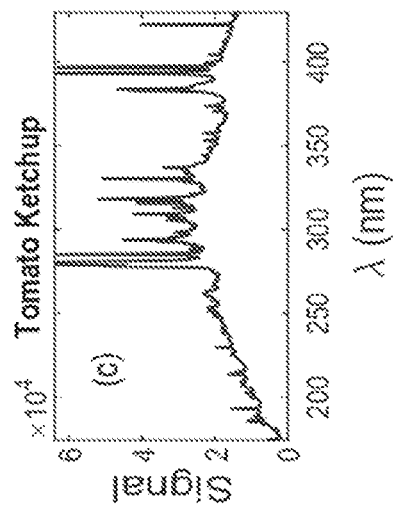

Examples of LIBS spectra from layered pellets of ash residue from other foodstuffs and formed according to the method of the present invention are illustrated in FIGS. 5A to 5D. Here spectra are illustrated which have been obtained using ashed residue of a) dog food (FIG. 5A); b) pizza Bolognese (FIG. 5B); c) tomato ketchup (FIG. 5C); and d) red wine (FIG. 5D). These provide some indication of the diversity of foodstuff which may be analysed by the method according to the present invention.

The invention claimed is:

1. A method of analysing a foodstuff sample using laser-induced breakdown spectroscopy, the method comprising:
   ashing the foodstuff sample to generate an ash residue;
   forming at least a portion of the ash residue into a layered pellet;
   exposing a first surface of the layered pellet; and
   subjecting the exposed first surface of the layered pellet to a laser-induced breakdown spectroscopy analysis;
   wherein the forming the ash residue into the layered pellet includes:
      loading at least the portion of the ash residue into to a die, the portion of the ash residue in the die having a first surface and a second surface, the second surface of the portion of the ash residue opposite the first surface of the portion of the ash residue,
      loading a support material into the die as a layer covering the second surface of the portion of the ash residue subsequently to loading at least the portion of the ash residue into the die, and
      compressing the portion of the ash residue and the support material in the die to form the layered pellet, such that
         the first surface of the portion of the ash residue at least partially defines the first surface of the layered pellet, and
         the portion of the ash residue is undiluted by the support material at least at the first surface of the portion of the ash residue.

2. The method according to claim 1, wherein the die includes a tubular body and a removable closure, the removable closure sealing a first open end of the tubular body and including a flat surface facing the first open end, the flat surface abutting the first surface of the ash residue based on the layered pellet being formed.

3. The method according to claim 1, wherein forming the ash residue into the layered pellet includes distributing the ash residue as an ash layer prior to loading the support material into the die.

4. The method according to claim 3, wherein the distributing the ash residue as the ash layer includes pressing the ash residue.

5. The method according to claim 1, wherein the support material is a particulate material.

6. The method according to claim 1, wherein the support material has a pellet shape prior to being loaded into the die.

7. The method according to claim 1, wherein the support material is cellulose.

8. The method of claim 1, wherein the subjecting the exposed first surface of the layered pellet to the laser-induced breakdown spectroscopy analysis includes exposing the first surface of the layered pellet to the laser-induced breakdown spectroscopy analysis while the layered pellet is situated in the die.

9. The method of claim 1, wherein the layered pellet includes an ash layer, the ash layer including the portion of the ash residue, the ash layer having a layer thickness of at least 5 µm in a direction perpendicular to the first surface of the layered pellet.

* * * * *